US012012647B2

United States Patent
Smith et al.

(10) Patent No.: US 12,012,647 B2
(45) Date of Patent: Jun. 18, 2024

(54) ADDITIVELY MANUFACTURED OXIDE DISPERSION STRENGTHENED MEDIUM ENTROPY ALLOYS FOR HIGH TEMPERATURE APPLICATIONS

(71) Applicant: United States of America as represented by the Administrator of NASA, Washington, DC (US)

(72) Inventors: Timothy M. Smith, Cleveland, OH (US); Robert W. Carter, Cleveland, OH (US); Christopher A. Kantzos, Cleveland, OH (US); Michael J. Kulis, Cleveland, OH (US)

(73) Assignee: United States Government Administrator of NASA, Washington, DC (US)

( * ) Notice: Subject to any disclaimer, the term of this patent is extended or adjusted under 35 U.S.C. 154(b) by 305 days.

(21) Appl. No.: 16/906,319

(22) Filed: Jun. 19, 2020

(65) Prior Publication Data

US 2020/0399744 A1    Dec. 24, 2020

Related U.S. Application Data

(60) Provisional application No. 62/864,619, filed on Jun. 21, 2019.

(51) Int. Cl.
*C22C 30/00* (2006.01)
*B22F 1/05* (2022.01)
(Continued)

(52) U.S. Cl.
CPC ............. *C22C 30/00* (2013.01); *B22F 1/05* (2022.01); *B22F 1/07* (2022.01); *B22F 1/16* (2022.01);
(Continued)

(58) Field of Classification Search
None
See application file for complete search history.

(56) References Cited

U.S. PATENT DOCUMENTS 5,372,845 A * 12/1994 Rangaswamy ........... C23C 4/06
427/242
5,989,491 A * 11/1999 Isomoto ............. C22C 32/0026
419/19
(Continued)

FOREIGN PATENT DOCUMENTS

EP       3088104 A1    11/2016
EP       3088104 B1    7/2018
(Continued)

*Primary Examiner* — Xiaobei Wang
(74) *Attorney, Agent, or Firm* — Robert H. Earp, III; Mark Wolfgang; Trenton J. Roche (57) ABSTRACT

An additive manufacturing powdered composite material includes metal particles coated with a coating of ceramic particles. The metal particles may include a ternary NiCoCr alloy, with select additions of minor amounts of other elements. The ceramic particles may include yttrium oxide or other oxides. The composite material is suitable for additive manufacturing (AM) into a component for high temperature (>1000° C.) applications. The AM component includes a metal matrix formed from the alloy, with the ceramic particles dispersed in the matrix.

11 Claims, 11 Drawing Sheets (51) Int. Cl.
*B22F 1/07* (2022.01)
*B22F 1/16* (2022.01)
*B33Y 70/10* (2020.01)
*B33Y 80/00* (2015.01)

(52) U.S. Cl.
CPC ........... *B33Y 70/10* (2020.01); *B22F 2302/25* (2013.01); *B22F 2304/10* (2013.01); *B33Y 80/00* (2014.12); *Y10T 428/12014* (2015.01)

(56) References Cited

U.S. PATENT DOCUMENTS

| | | |
|---|---|---|
| 9,796,019 B2 | 10/2017 | She et al. |
| 10,493,524 B2 | 12/2019 | She et al. |
| 10,906,105 B2 | 2/2021 | Opalka et al. |
| 2016/0279704 A1 | 9/2016 | She et al. |
| 2017/0368602 A1 | 12/2017 | She et al. |
| 2018/0141120 A1* | 5/2018 | Storck ..................... B22F 1/05 |
| 2019/0321894 A1 | 10/2019 | Opalka et al. |
| 2020/0254518 A1 | 8/2020 | She et al. |

FOREIGN PATENT DOCUMENTS

| | | | |
|---|---|---|---|
| EP | 3556491 A1 | | 10/2019 |
| EP | 3556491 B1 | | 11/2021 |
| JP | 2002256363 A | * | 9/2002 |
| JP | 2005023387 A | * | 1/2005 |

* cited by examiner

ADDITIVELY MANUFACTURED OXIDE DISPERSION STRENGTHENED MEDIUM ENTROPY ALLOYS FOR HIGH TEMPERATURE APPLICATIONS

CROSS REFERENCE TO RELATED APPLICATION

This application claims priority to U.S. Provisional Patent Application Ser. No. 62/864,619 filed Jun. 21, 2019, which is expressly incorporated herein by reference.

ORIGIN OF THE INVENTION

The invention described herein was made by an employee of the United States Government and may be manufactured and used by or for the Government for Government purposes without the payment of any royalties thereon or therefor.

BACKGROUND

Additive manufacturing (AM) currently facilitates new avenues for component fabrication that have not been fully explored. Additive manufacturing techniques have broadened many aspects of component design, enabled part count reduction, and decreased commissioning time for prospective hardware and industrial applications. Currently, the majority of research relating to AM of metallic materials has been conducted on traditional alloys.

Laser powder bed fusion (L-PBF), which is a type of AM, uses a finely focused laser to melt metallic powder to form three-dimensional (3D) parts, and because of the melting process is analogous to welding. By virtue of this welding, there arises problems for L-PBF of these traditional alloys because they are often difficult to weld because of their wide freezing range (i.e. the gap between the solidus and liquidus temperatures). Unfortunately, many of these alloys, which are used for ultra-high temperature applications (i.e. applications at >1000° C.), are therefore difficult to weld and thus are not well suited for L-PBF.

One alloy system that has shown promise is the multi-principal element alloy (MPEA) class. The discovery and growth of this class of alloys, which are often called "High Entropy alloys", has coincided with the development of AM. This development has led to the identification of a wide range of MPEAs, such as the ternary alloy NiCoCr, which has demonstrated good mechanical properties over a wide range of temperatures and stresses. Recent studies have also presented favorable results from producing the NiCoCr alloy using AM. Further, "Cantor alloy" (NiCoCrMnFe) and its derivatives have been successfully fabricated into AM components. This success may result from the small gap between the solidus and liquidus temperatures of these alloys, which reduces the risk of heat affected zone (HAZ) cracking and lowers residual stresses. Unfortunately, the phase simplicity of these alloys, which enhances their ability to be additively manufactured, also limits their high temperature mechanical properties, and thus AM components made from these alloys may not be suitable for high temperature (>1000° C.) applications. As such, there is a need for an additional strengthening mechanism to be found.

Dispersion strengthening (DS), primarily through the use of ceramics such as oxides, is a strengthening technique that was explored in the 1980's, and was expected to replace existing Ni-base superalloys in high temperature applications, such as extreme gas turbine environments, and to replace stainless steels used in nuclear applications, such as advanced fission or fusion reactors.

Although DS is an effective strengthening mechanism in most applications, the incorporation of nano-scale dispersoids (e.g. ceramics such as oxides) into a metal matrix was found to be an extremely difficult manufacturing challenge that was cost-prohibitive for many applications. In particular, DS alloys typically have been manufactured through a mechanical alloying (MA) process, in which the dispersoids were alloyed with the metallic powder through high energy ball milling. This process resulted in metal alloy particles being pulverized and broken down, thus changing the shape of the alloy particles from rounded to irregularly shaped. The irregularly shaped particles had to be sifted out, and therefore, the alloy was significantly more expensive to fabricate compared to more conventional superalloys and is unsuitable for AM. Further, this process resulted in some level of contamination of the alloy from material from the balls used in ball milling.

Recent studies have successfully used DS alloys, which have been produced by mechanical alloying, in an AM process to produce DS components. The mechanical properties of these components have been promising. However, the mechanical alloying of these materials is still required to incorporate the dispersoids into the metal matrix. Because of this, AM processing with mechanically alloyed powder is problematic because the highly deformed shapes of the alloy particles have poor flow properties, and thus sifting of the material to remove irregularly shaped particles is still necessary, without which the material would produce reduced feedstock delivery properties which is detrimental for the AM process. Studies have also shown that alloy particles shape and size distribution in these mechanically alloyed powders contribute significantly to poor quality AM components. Other methods of incorporating dispersoids into alloy powders through chemical reactions or depositions have been explored for the AM process. However, these techniques require added complexity and expense and therefore limits their commercial viability.

Therefore, there currently exists a need for high temperature alloys that can be produced through L-PBF or similar AM processes.

SUMMARY

An additive manufacturing powdered composite material includes metal particles coated with a coating of ceramic particles. The metal particles include an alloy including 30-35 wt % cobalt, 26-31 wt % chromium, 0-3.0 wt % rhenium, 0-1.0 wt % aluminum, 0.01-0.1 wt % carbon, 0-1.0 wt % titanium, and nickel making up a balance of a weight of the alloy. The ceramic particles include yttrium oxide, halfnium oxide, zirconium oxide, or combinations thereof.

An additively manufactured component includes ceramic particles dispersed in a metal matrix. The metal matrix includes an alloy including 30-35 wt % cobalt, 26-31 wt % chromium, 0-3.0 wt % rhenium, 0-1.0 wt % aluminum, 0.01-0.1 wt % carbon, 0-1.0 wt % titanium, and nickel making up a balance of a weight of the alloy. The ceramic particles include yttrium oxide, halfnium oxide, zirconium oxide, or combinations thereof.

DETAILED DESCRIPTION

High temperature materials include Refractory Metals, Carbon-Carbon composites, ceramic matrix composites (CMC's), Ni-base superalloys, Oxide Dispersion Strengthened (ODS) superalloys.

ODS alloys offer higher temperature capabilities compared to Ni-base superalloys. However, it has been a challenge to produce components made from ODS alloys through conventional manufacturing methods, because these require mechanical alloying, hot compaction, and subtractive shaping to attain the finished component, which results is an expensive and time-consuming process.

There is currently an interest to produce an alloy capable of being used in extreme temperature environments (>1000° C.) that is also amenable to additive manufacturing. However, the mechanical alloying used to make conventional ODS superalloys results in irregularly shaped particles and the contamination of the alloy from the grinding implements, and thus these conventionally formed oxide dispersion strengthened (ODS) high entropy alloys are not suitable for AM.

The present subject matter is a new ODS alloy with improved oxidation and strength characteristics, which has a freezing range (temperature difference between the liquidus and solidus) that has been maintained at or below 80° C. Alloys that maintain a narrow freezing range of 80° C. or less, may avoid many of the defects that plague AM of other high temperature alloys such as Ni-base superalloys with a wider freezing range. The present ODS alloy may suppress the formation of the detrimental topologically close packed phases, while promoting the formation of high temperature stable grain boundary strengthening metal carbides (MC). The alloy may be strengthened by the incorporation of nano-scale ceramic particles (e.g. oxide particles). The addition of the ceramic particles with higher amounts of solid solution strengtheners and the formation of MC's, may provide superior mechanical properties compared to the current state of the art wrought superalloys at extreme temperatures.

The present subject matter provides a high-temperature alloy suitable for use in AM in order to produce a component that can be used in high-temperature applications, such as in advanced gas turbine and rocket engines. An oxide dispersion strengthened medium entropy alloy (ODS-MEA) may be formed into a component using L-PBF, which component may be used for extreme temperature environments currently unattainable by state-of-the-art AM alloys.

The ternary NiCoCr MEA has been shown in multiple studies to exhibit a solid solution face-centered cubic (FCC) phase from cryogenic temperatures (−196° C.) to its melting temperature of 1400° C. Therefore, its use can avoid the deleterious phase changes in extreme temperature environments which plague Ni-base superalloys. In addition, the lack of intermetallic phase formation in the NiCoCr MEA makes it a promising alloy for additive manufacturing as stress cracking and dendritic segregation may be minimized.

A limited post-processing heat treatment may be employed to acquire the desired microstructure for the finished component. For improved high temperature strength and creep properties of the ODS alloy, temperature stable Yttria particles may be used as the ceramic particles.

Referring to the figures, the present subject matter provides an oxide dispersion strengthened multi-principal element alloys (ODS-MPEA, also referred to herein as ODS-MEA), produced without the use of traditional mechanical alloying or chemical reactions, and which can be used to form a component using AM.

The processing technique employs a powder 2 of metal particles 4, and a powder 6 of ceramic particles 8. The process uses resonant acoustic mixing to alloy the ceramic particles 8 with the metal particles 4 and thereby coat the metal particles 4 with a coating 22 of the ceramic particles 8, and thus forming a powdered composite material 12. This powdered composite material 12, also referred to herein as a coated powder, is then subjected to an additively manufacturing process to produce an additively manufactured ceramic dispersion strengthened metal component 14 (also referred to herein as "AM component" and "AM build").

The acoustic mixing process is advantageous in that it is a contactless mixing process, in which no mixing implements (e.g. balls, paddles, blades, etc.) contact the two powders 2, 6, each of which may have particles 4, 8 with rounded shapes. As such, the mixing process inhibits contamination of the powdered composite material 12 and also inhibits the breakdown of the rounded metal particles 4 into irregular shapes, which may otherwise occur from contact with a mixing element as in a mechanical alloying process. The powdered composite material 12 thus has a high purity and includes composite particles/coated metal particles 16 with a rounded shape, and therefore retains the good flow properties of the original rounded metal particles 4.

The powdered composite material 12, having good flow properties from the rounded shape of its composite particles 16, can then be easily processed via AM and thus consolidated to produce the AM component 14.

1. Metal Powder

The metal powder 2 is not particularly limited, and may include any metal or alloy thereof, and combinations of several different alloy powders. In a non-limiting embodiment, the metal powder 2 may include a ternary NiCoCr alloy optionally with minor amounts of dopants of rhenium, aluminum, carbon, titanium, tungsten, niobium, molybdenum, zirconium, copper, iron, nitrogen, phosphorus, sulfur, silicon, boron, hafnium, manganese, and/or tantalum; but other metals or alloys may also be suitable.

In an embodiment, the metal powder 2 is a solid solution alloy including a balance of nickel (Ni), 33-36 wt. % cobalt (Co), 29-32 wt. % chromium (Cr), 0-2 wt. % tungsten (W), 0-0.05 wt. % carbon (C), with minor amounts of other elements such as up to 1000 ppm copper (Cu), up to 1000 ppm iron (Fe); up to 500 ppm nitrogen ($N_2$), up to 150 ppm phosphorus (P), up to 150 ppm sulfur (S), and up to 100 ppm silicon (Si).

Nickel is used primarily as a FCC stabilizer. Cobalt is included as for solid solution strengthening of the FCC phase. Chromium is included for improving corrosion and oxidation properties, and as a solid solution strengthener. Tungsten is for solid solution strengthening of the FCC phase. Carbon is used as a grain boundary strengthener. Copper is used as a solid solution strengthener. Iron is included as a solid solution strengthener.

In another embodiment, the metal powder 2 is a solid solution alloy including a balance of Ni; Co: 30-35 wt %; Cr: 26-31 wt %; rhenium (Re): 0-3.0 wt %; aluminum (Al): 0-1.0 wt %; C: 0.01-0.1 wt %; titanium (Ti): 0-1.0 wt %; niobium (Nb): 0.25-1.5 wt %; and W: 1.5-4.5 wt %.

In another embodiment, the metal powder 2 is a solid solution alloy including a balance of Ni; Co: 30-35 wt %; Cr: 26-31 wt %; C: 0.01-0.1 wt %; at least one of a) Re: 0.1-3.0 wt %; b) Al: 0.1-1.0 wt %; and c) Ti: 0.1-1.0 wt %; optionally with Nb: 0.25-1.5 wt %; and optionally with W: 1.5-4.5 wt %.

The size of the metal particles 4 is also not particularly limited, and the metal particles 4 may have a rounded shape and be micron sized, e.g. with an average particle size of 10-45 μm, which size is retained even after the acoustic mixing.

The amount of metal powder 2 in the composite material 12, i.e. the amount used to mix with the ceramic powder 6 to make the composite material 12, is not particularly limited and may range from 95.0-99.5 wt % of the total weight of the composite material 12.

2. Ceramic Powder

The ceramic powder 6 is not particularly limited, and may include combinations of several different ceramic powders.

The ceramic powder 6 is included as a dispersion strengthener, and for improving oxidation properties, strength properties, and creep properties.

In non-limiting embodiment, the ceramic powder may include an oxide, for example, yttrium oxide ($Y_2O_3$), hafnium oxide ($HfO_2$), zirconium oxide ($ZrO_2$), aluminum oxide ($Al_2O_3$), thorium oxide ($ThO_2$), or combinations thereof; but other ceramic powders may also be suitable. The size of the ceramic powder 6 is also not particularly limited, and the ceramic particles 8 may be nano-sized, e.g. have an average particle size of 100-200 nm.

The amount of ceramic powder 6 in the composite material 12, i.e. the amount used to mix with the metal powder 2 to make the composite material 12, is not particularly limited and may range from 0-2 wt % or 0.5-1.5 wt % or 0.9-1.1 wt % of the total weight of the composite material 12.

3. Mixing

The process of mixing of the two powders 2, 6, to alloy them together is not particularly limited and may be performed using mixing parameters that are suited for attaining a desired characteristic for the composite material 12 and/or for the AM component 14.

In a non-limiting embodiment, a resonant acoustic mixer is used to mix and alloy the two powders 2, 6. Conventional acoustic mixers can be used. The two powders 2, 6 may be placed in a mixing container 18 (e.g. a polyurethane container) and placed on an oscillating surface 20, and thereby subjected to a longitudinal pressure wave of a short amplitude and high frequency. The oscillating surface 20 may be part of a resonant acoustic mixer, which may attain a resonance between a vibrating spring system of the oscillating surface 20 and the stored mass of the powders 2, 6 and container 18.

Figure 1:
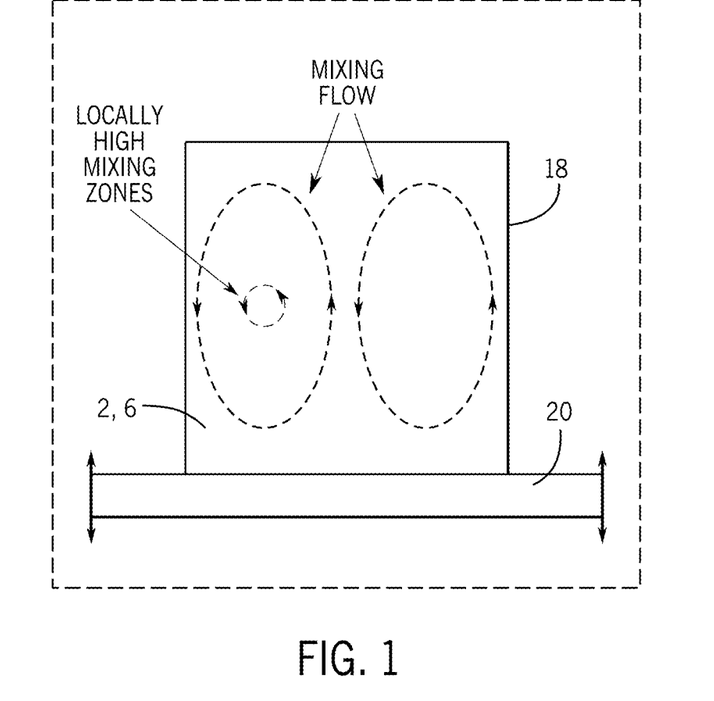
FIG. 1 is a schematic side view of a resonant acoustic mixing process according to the present subject matter.
Figure 2:
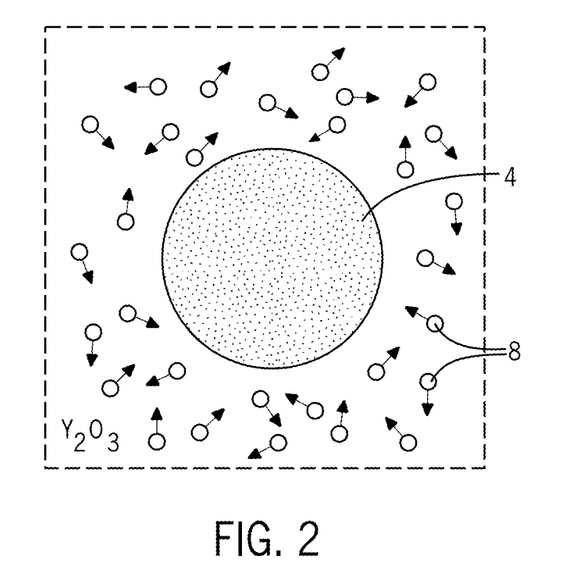
FIG. 2 is a schematic view of a metal particle during acoustic mixing with ceramic particles according to the present subject matter.
Figure 3:
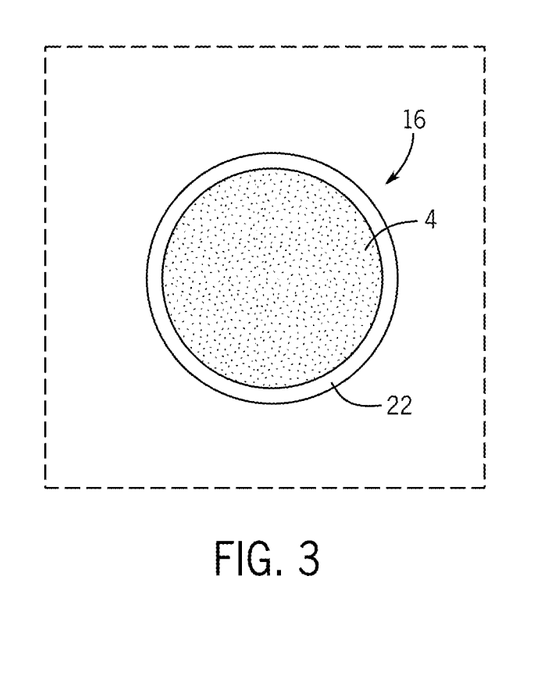
FIG. 3 is a schematic view of a composite particle according to the present subject matter.
Figure 7:
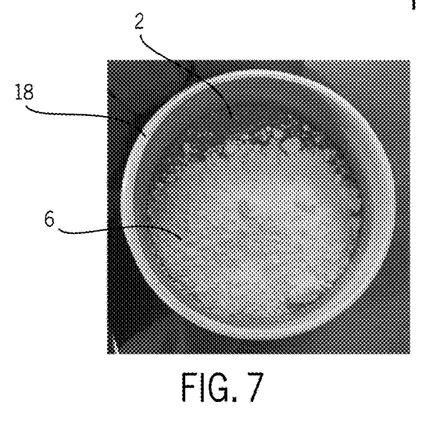
FIG. 7 is a photograph of metal powder and ceramic powder in a mixing container according to the present subject matter.
Figure 8:
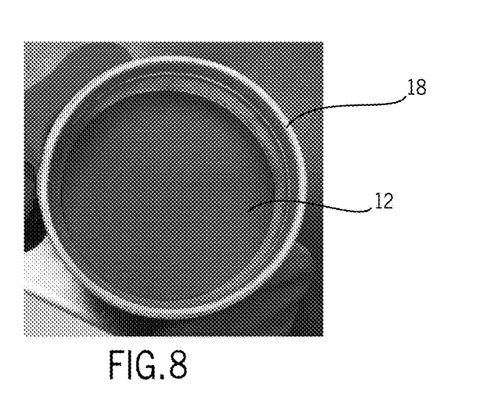
FIG. 8 is a photograph of a composite material according to the present subject matter.

This mixing process homogenizes the two powders 2, 6, eventually coating the relatively larger metal particles 4 with a coating 22 of the relatively smaller ceramic particles 8 after an elapsed mixing time (e.g. for five minutes up to one or more hours). The two powders 2, 6 are depicted together in a container 18 in FIG. 7 before acoustic mixing, and as such, the powders 2, 6 are visually distinguishable from each other in FIG. 7, where the metal powder 2, which appears grey, is darker than the ceramic powder 6, which appears white. The unmixed powders 2, 6 are schematically depicted in FIG. 2, where the larger metal particle 4 is not coated by the smaller ceramic particles 8. However, after acoustic mixing, the two powders 2, 6 are alloyed, and as such, visually appear in FIG. 8 as a homogeneous powdered composite material 12. This is schematically depicted in FIG. 3, where the metal particle 4 is coated with a coating 22 of ceramic particles 8 to form a composite particle 16. Such alloying of the powders 2, 6 is accomplished through a circulating mixing flow that is created in the mixing container 18 by the oscillating surface 20, which flow is generally shown in FIG. 1 as an upward flow through a central portion of the mixing container 18, radially flowing outward toward the outside portions of the mixing container 18, and then flowing back down along the outside portions of the mixing container 18 to circulate again. A local region of intense mixing is located between the central portion and the outside portions of the mixing container 18 as depicted in FIG. 1. By this mixing flow, the two powders 2, 6 are alloyed.

Figure 4:
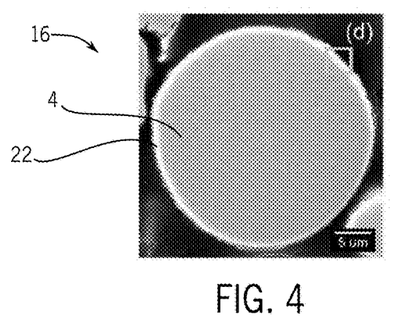
FIG. 4 is an SEM image of a composite particle according to the present subject matter.
Figure 5:
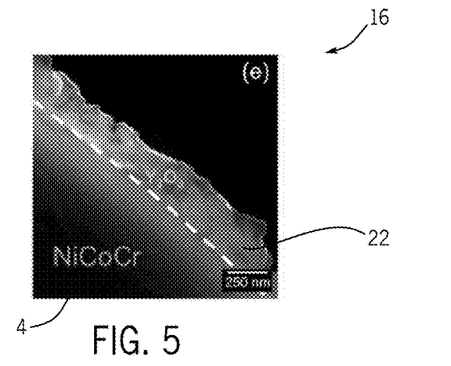
FIG. 5 is a high-resolution image of the composite particles of FIG. 4.
Figure 6:
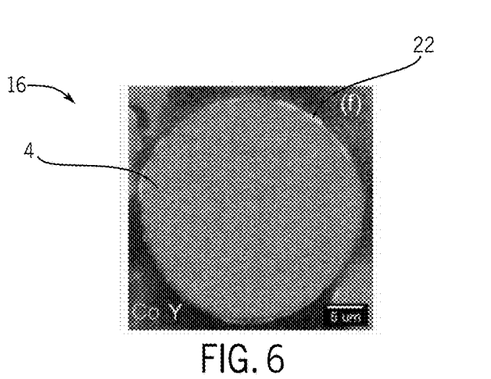
FIG. 6 is an EDS image of a composite particle according to the present subject matter.

An example powdered composite material 12 was prepared, where micron sized NiCoCr metal powder 2 was mixed with nano-sized $Y_2O_3$ ceramic powder 6 to form the powdered composite material 12. A cross section image of a composite particle 16 from the example is shown in FIG. 4 using a scanning electron microscope (SEM), and a detailed portion of the same composite particle 16 is shown in the high-resolution SEM image of FIG. 5. The SEM images show the coating 22 of the ceramic particles 8 (e.g. $Y_2O_3$) fully covering the surface of the metal particle 4, and the coating 22 having an average coating thickness of 100-500 nm, or about 250 nm. FIG. 6 shows an energy dispersive spectroscopy (EDS) analysis image using an Everhart-Thornley detector, which confirmed that the metal particle 4 was fully coated with a coating 22 (lighter outside portion) of the ceramic particles 8.

Qualitative Hall Meter flow tests were performed on the example powdered composite material 12, and these indicated that the coated powder 12 had similar flowability as compared to the virgin (V) uncoated NiCoCr metal powder 4. These flow characteristics were retained likely because the rounded morphologies of the NiCoCr powder were essentially unchanged through the acoustic mixing process. This is shown between FIGS. 9 and 10, and between FIGS. 11 and 12.

Figure 9:
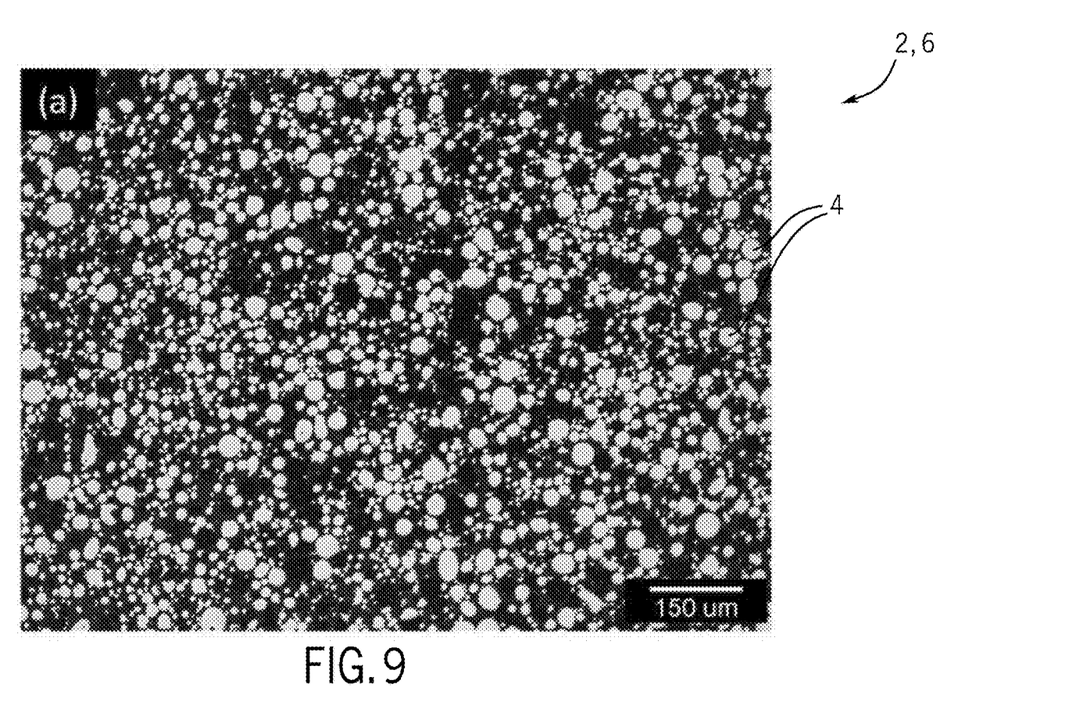
FIG. 9 is an optical image of metal particles before acoustic mixing with ceramic particles according to the present subject matter.
Figure 10:
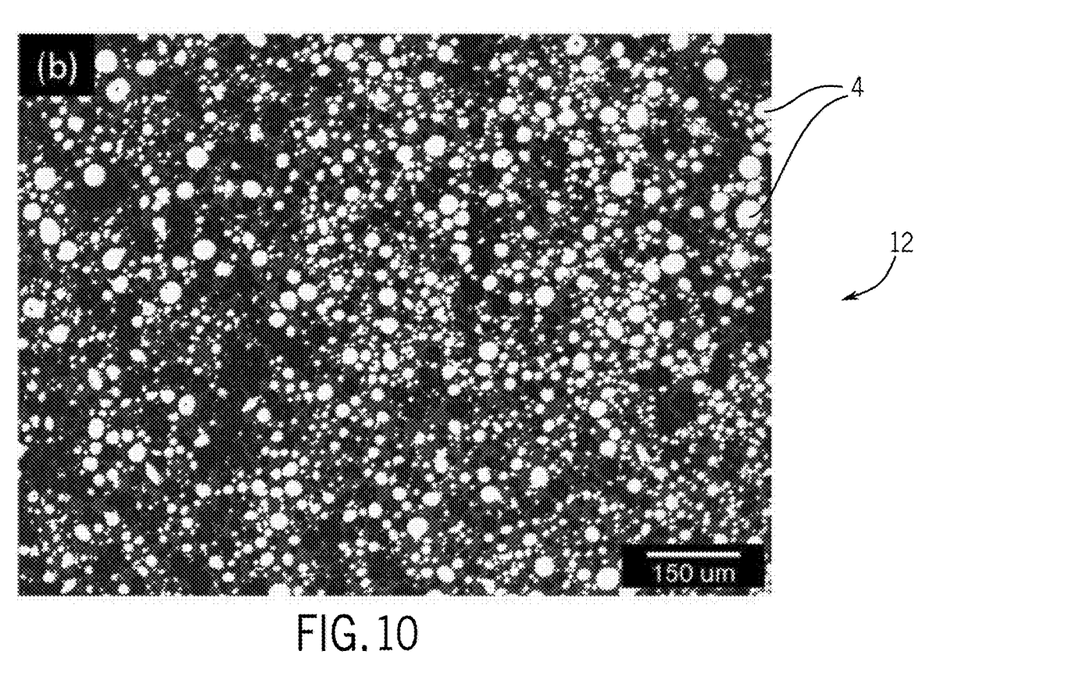
FIG. 10 is an optical image of a composite material according to the present subject matter.
Figure 11:
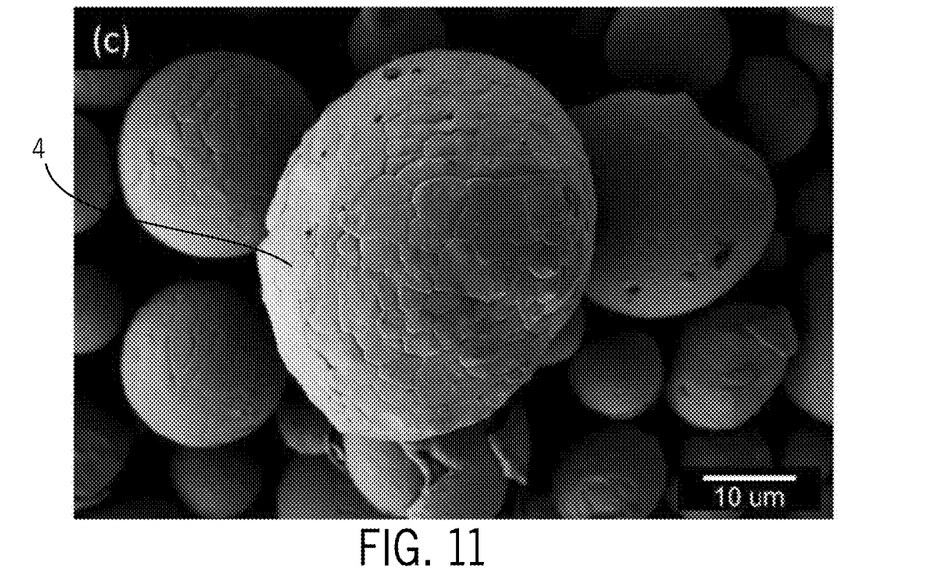
FIG. 11 is an SEM image of the metal particles of FIG. 9 before acoustic mixing with ceramic particles.
Figure 12:
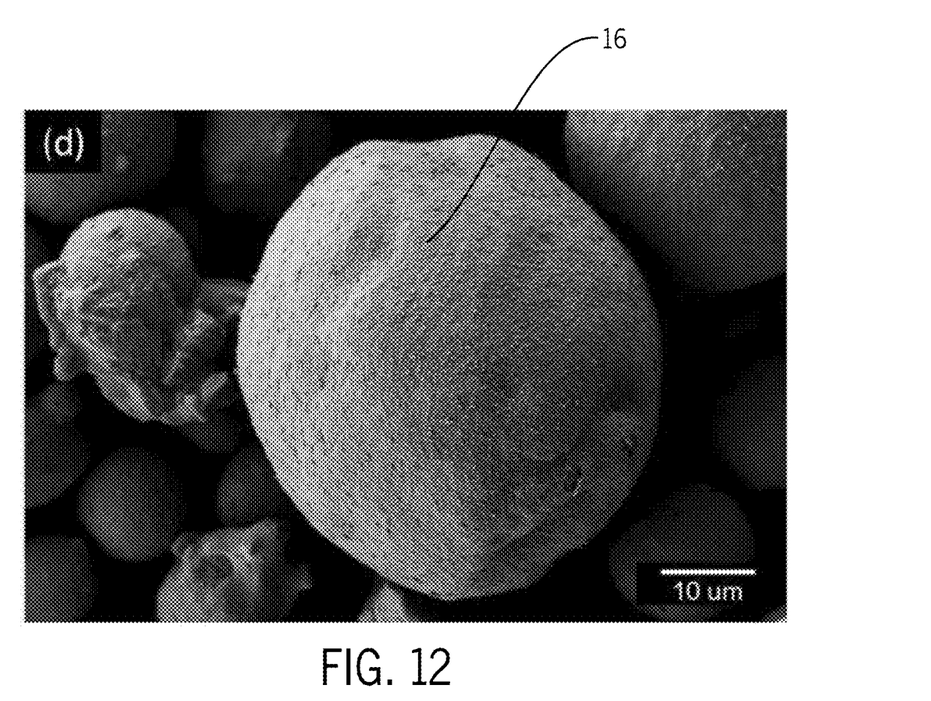
FIG. 12 is an SEM image of the composite material of FIG. 10.

FIG. 9 is an optical image showing the NiCoCr metal particles 4 (light rounded particles) before acoustic mixing with the $Y_2O_3$ nano-sized ceramic particles 8, and having a rounded morphology. FIG. 10 is an optical image showing the composite material 12, where the metal particles 4 retain the same rounded shape even after acoustic mixing and being coated with the ceramic particles 8. FIG. 11 is an SEM image of the same NiCoCr metal particles 4 before acoustic mixing with the $Y_2O_3$ nano-sized ceramic particles 8. FIG. 12 is an SEM image showing the coated particles 16, and confirms that the acoustic mixing step successfully coated the NiCoCr metal particles 4 with the $Y_2O_3$ nano-sized ceramic particles 8, such that the metal particles 4 were fully coated by the coating 22 of ceramic particles 8. The rounded coated particles 16 are thus more suitable for AM than conventional mechanical alloyed particles, which are highly deformed particles that are irregularly shaped (e.g. platelet-like) due to the mechanical alloying.

4. Additive Manufacturing

Once the composite material 12 is prepared by acoustic mixing, the composite material 12 may be subjected to an AM process to form an AM build 14. The AM process is not particularly limited, and may include any known AM process. In a non-limiting embodiment, the AM process may include laser powder bed fusion (L-PBF).

The AM process described herein may be performed, for example, using an L-PBF machine 24 (FIG. 13), which can include a laser 26 for emitting laser radiation 28 and a scanner system 30 for directing the laser radiation 28. The machine 24 may include a powder delivery platform 32 and a build platform 34. The composite material 12 may be arranged on the powder delivery platform 32, which may move up to present some of the composite material 12 to a roller or arm 36, which moves as indicated by the arrow to the right, and thus moves some of the composite material 12 from the powder delivery platform 32 to the build platform 34. On the right side of the machine 24, there is depicted the L-PBF process being performed to additively build and consolidate successive layers in a powder bed 38 of the composite material 12 to form an AM component 14 within the powder bed 38.

Figure 13:
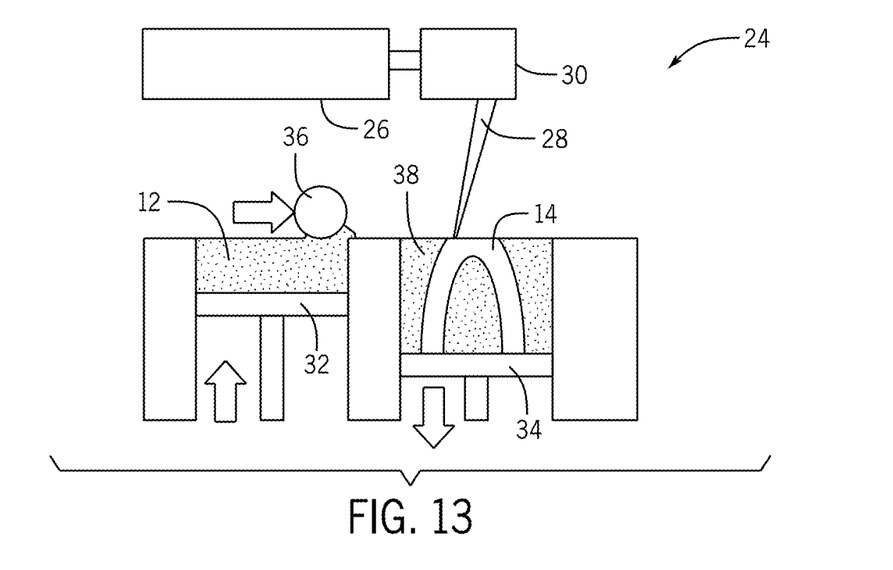
FIG. 13 is a schematic side view of a laser powder bed fusion process according to the present subject matter.

In particular, the laser 26 and scanner system 30 is operated to direct the laser radiation 28 onto the top layer 40 of the powder bed 38 to selectively melt/sinter a selected portion of the composite material 12 to form a consolidated layer 42 on the build platform 34. The roller/arm 36 may then operate to spread and then level more of the composite material 12 as the next top layer over the consolidated layer 42. These steps may be repeated to successively build a plurality of consolidated layers 42, each of which fuse by laser energy to the previously formed consolidated layer 42 to form the AM component 14.

The AM component 14, formed by the layer-by-layer buildup of the plurality of consolidated layers 42 in this additive manufacturing process, may be surrounded by a powder bed 38 containing the composite material 12, which has not been heated by the laser. Thereafter, the AM component 14 may be removed from the powder bed 38 and subject to a further heating treatment process to improve certain properties of the AM component 14. The AM component 14 may be additively manufactured in this manner by following a predetermined model for the AM component 14, which model may be stored in a computer aided design (CAD) file that is used to control the scanner system 30 to direct the laser radiation 28 upon each layer of the composite material 12.

The methods of forming the AM component 14 may be practiced using machines other than those described herein, including a laser sintering machine that does not include the powder delivery platform 32 and the arm or roller 36 for spreading each successive top layer 40 of the composite material 12 onto the build platform 34. Other suitable machines may include other delivery systems for forming successive top layers 40 of the composite material 12 on the build platform 34, including a gravity fed delivery system for example.

The L-PBF process may be performed using an L-PBF machine 24 as shown in FIG. 13. As part of the L-PBF process, the composite material 12 may be spread onto the build platform 34 so as to form a top layer 40 having a predetermined thickness, e.g. 100-150 μm. The laser radiation 28 from the laser 26 is selectively irradiated on a predetermined area (i.e. selected cross-sectional area) of the top layer 40 of the powder bed 38 to fuse the composite material 12 in the predetermined area of the top layer 40 of the powder bed 38, thus forming a consolidated layer 42 of the composite material 12 in the powder bed 38 having a thickness of 100-150 μm. The laser 26 in the L-PBF system may be $CO_2$ laser. The build platform 34 then moves down by a one-layer thickness (e.g. 100-150 μm), and a new top layer 40 is delivered on top of the previously built consolidated layer 42. This process of spreading the composite material 12, and then selectively irradiating the composite material 12, is successively repeated to build up additional consolidated layers 42 on top of the prior consolidated layers 42, where each successive consolidated layer 42 fuses with the previously-formed consolidated layer 42 to form an AM component 14 in the powder bed 38.

Figure 14:
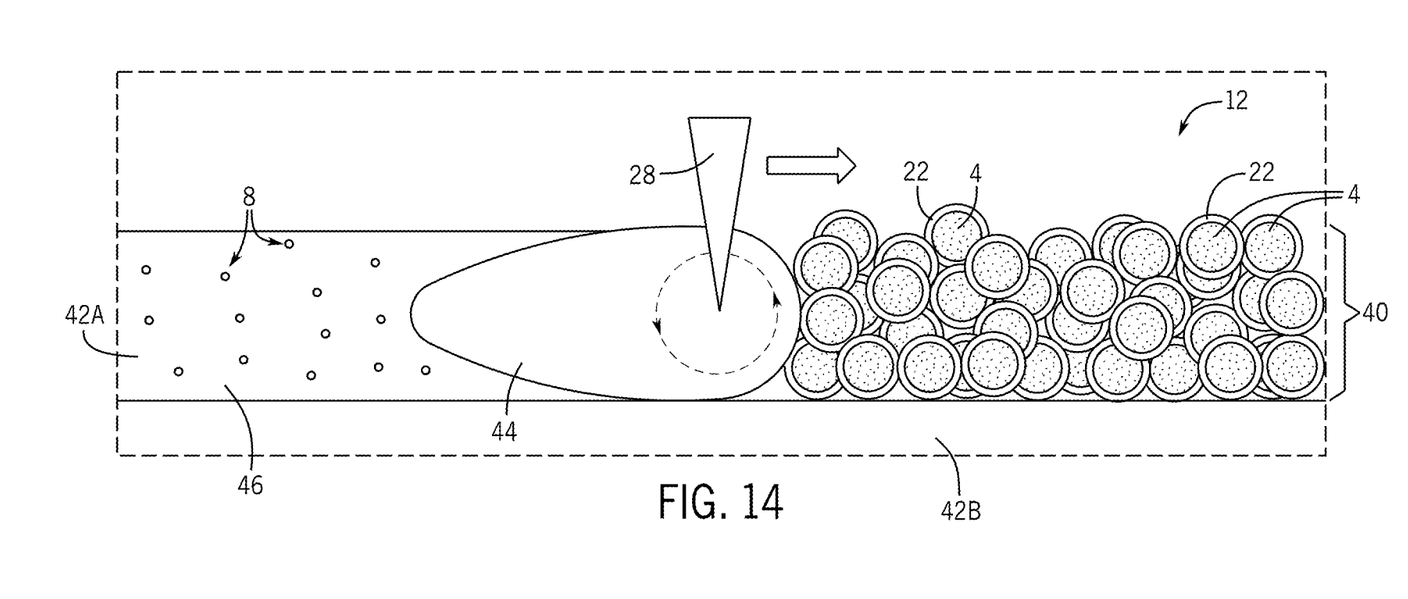
FIG. 14 is a schematic detailed view of a laser powder bed fusion process according to the present subject matter.

With reference to FIG. 14, the presently-formed consolidated layer 42A may fuse with the previously-formed consolidated layer 42B, and so on, during the laser sintering of the presently-formed consolidated layer 42A. This may result in the layer-by-layer buildup of the AM component 14. Such layer-by-layer process of building the AM component 14 may operate automatically by computer control of the scanner system 30 of the L-PBF machine 24, where the selected area of the top layer 40 of the powder bed 38 to be irradiated is defined by a computer model of the AM component 14 in a CAD file.

As schematically depicted in FIG. 14 and without being bound by any particular theory, it is believed that the melt pool 44 created by the laser radiation 28 during the L-PBF process is turbulent, thus mixing the melt pool 44 multiple times over before solidification can take place to form the consolidated layer 42A. This turbulence in the L-PBF melt pool 44 is believed to sufficiently disperse the ceramic particles 8 into the metal matrix 46 formed from the metal of the metal particles 4.

Figure 15:
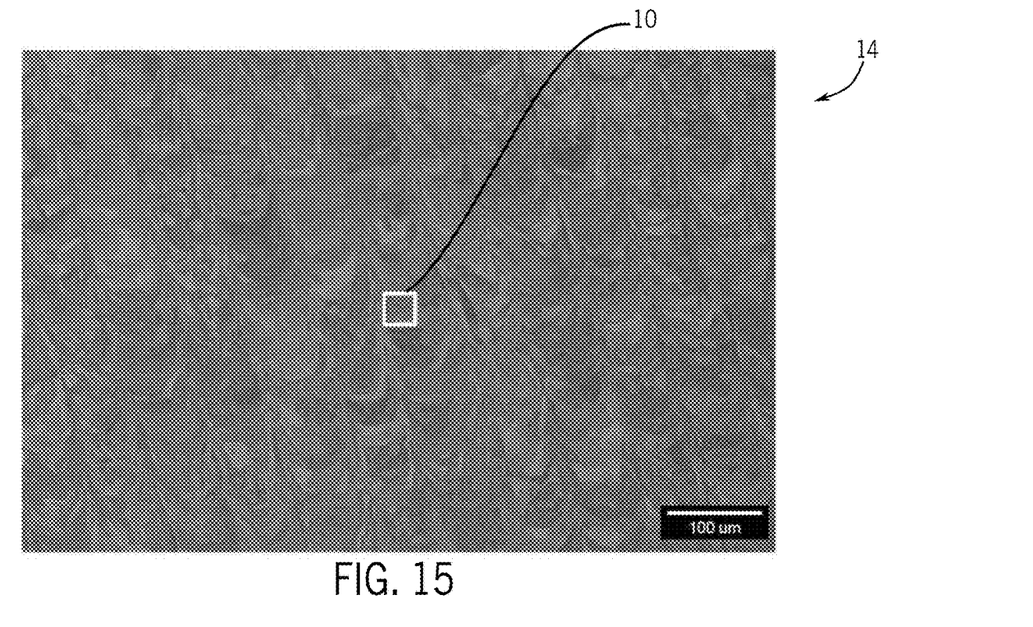
FIG. 15 is an SEM image of an additively manufactured component according to the present subject matter.
Figure 16:
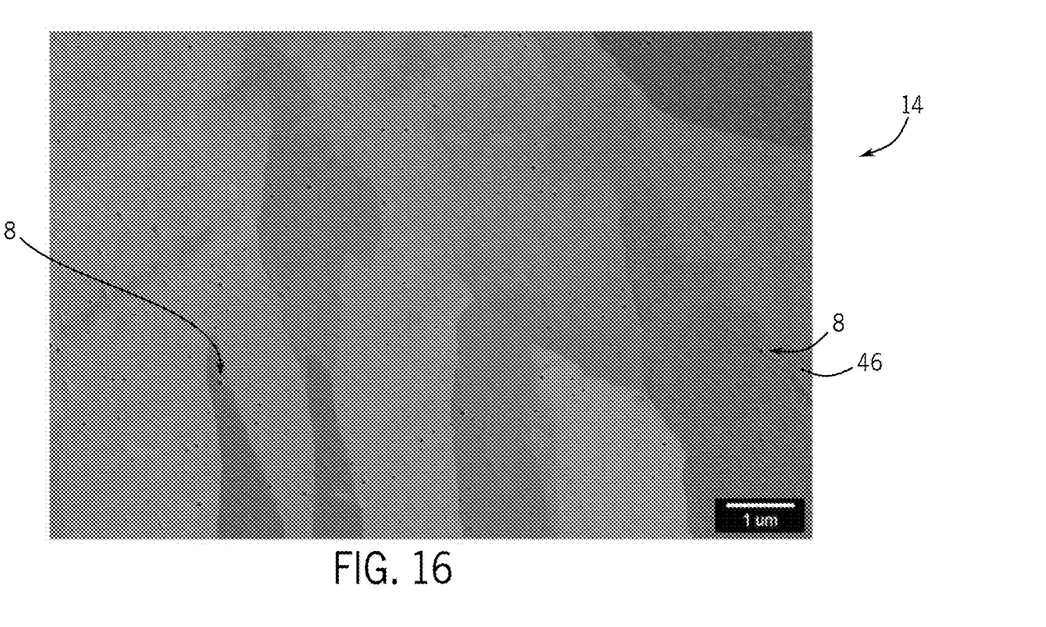
FIG. 16 is a high-resolution SEM image of the additively manufactured component of FIG. 15.

SEM images of an example AM component 14 are shown in FIGS. 15 and 16. As seen in the high-resolution SEM image of FIG. 16, which is taken from the area of the white square 10 in FIG. 15, the ceramic particles 8 are dispersed in a metal matrix 46, and confirms that the ceramic particles 8 are randomly dispersed throughout the microstructure of the matrix 46 without any noticeable pattern that may have resulted from the laser scan path. Electron dispersive X-ray spectroscopy (EDS) was performed on the example AM component 14, and the chemical maps confirmed that the darker particles in FIG. 16 were ceramic particles (i.e. $Y_2O_3$), rather than some form of contamination. Numerous other micrographs taken randomly throughout multiple other inventive AM builds revealed similar results, confirming the successful incorporation of the ceramic particles into the AM components 14. The chemical maps also confirmed that the metal alloy (i.e. NiCoCr) remained a solid solution FCC phase during the L-PBF process. SEM analysis of the ceramic particles showed a 0.6% volume fraction of ceramic particles (i.e. $Y_2O_3$) present in the example AM component 14. This amount may represent a lower limit for the ceramic content in the AM component 14. Example AM components 14 were produced, and these were 99.9% dense for dispersion strengthened medium entropy alloys (DS-MEA).

In the L-PBF process of forming the AM component 14, the powder bed 38 on the build platform 34 and the composite material 12 on the deliver platform 32 may be heated.

Upon completion of this process, the un-fused composite material 12 and the AM component 14 in the powder bed 38 are allowed to cool before being removed from the build platform 34. The un-fused composite material 12 in the powder bed 38 may be re-used to build a different AM component in a subsequent L-PBF process. The AM component 14 may then be subjected to post L-PBF heat treatment to improve certain properties of the AM component 14.

5. Component

The AM component 14 is not particularly limited, and may have any shape as can be prepared by AM, and may be used in high-temperature environments e.g. those >1000° C. such as in advanced gas turbine and rocket engines.

6. Examples

Various comparative examples were prepared using virgin (i.e. non-coated) medium entropy alloy particles (V-MEA) of NiCoCr, which were subjected to L-PBF process to form comparative AM components. These were compared to inventive examples using an oxide dispersion strengthened medium entropy alloy (DS-MEA) of NiCoCr particles coated with $Y_2O_3$ particles produced by the instant method, which were also subjected to L-PBF processes to form inventive AM components 14. Mechanical and metallurgical test bars of the DS-MEA were successfully produced via L-PBF, which created an AM component 14 including particles 8 of $Y_2O_3$ dispersed in a matrix 46 of NiCoCr, and which were successfully consolidated into 99.9% dense parts.

Microstructural characterization of the V-MEA builds (comparative AM components) and DS-MEA AM builds (inventive AM components) was made. The comparative and inventive AM components were characterized both before and after a high stress hot isostatic press (HIP) cycle at 1185° C., which was performed to relieve residual stress. The grain structures derived from electron back scatter diffraction (EBSD) maps of the V-MEA and DS-MEA builds with and without post processing are presented in FIG. 17 with the build direction denoted by the Z axis.

Figure 17:
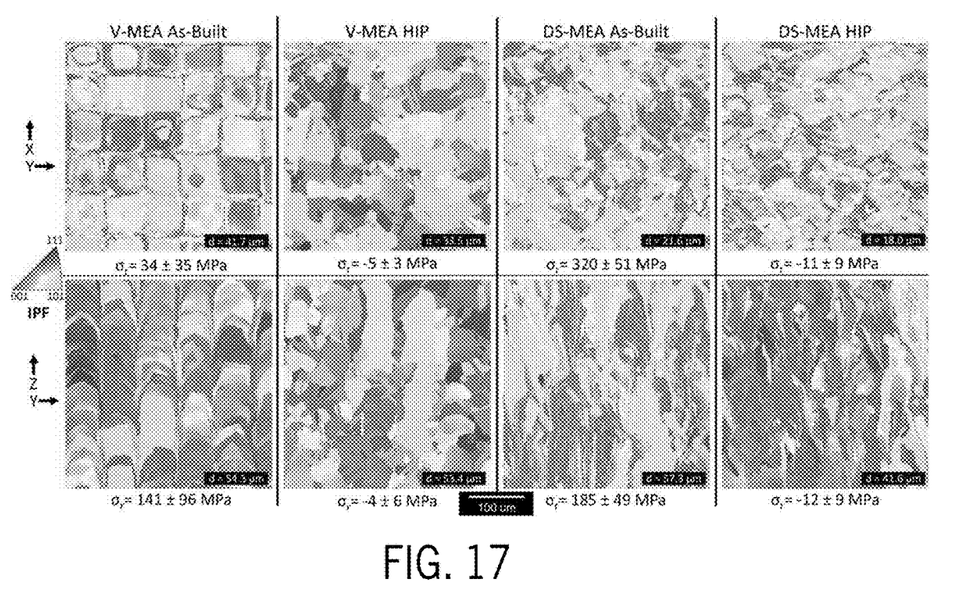
FIG. 17 are electron back scatter diffraction maps of inventive and comparative examples of additively manufactured components according to the present subject matter.

Large variations in grain structure and average grain diameter between both the as-built and post-HIP conditions for the V-MEA and DS-MEA builds were observed. Average grain diameters (d) calculated from the EBSD maps are presented for each image in FIG. 17. As can be seen in FIG. 17, the laser path is evident in the as-built XY plane EBSD maps for both samples, and produced a grid like grain structure of large grains surrounded by finer grains. For the case of the V-MEA builds, the HIP cycle promoted grain recrystallization and growth resulting in a much more equi-axed structure, though some large elongated grains were still captured in the ZY plane EBSD maps.

In contrast, the $Y_2O_3$ in the DS-MEA builds clearly suppressed grain growth and recrystallization by pinning the grain boundaries both during the L-PBF build process and subsequent HIP cycle. Indeed, minimal recrystallization was observed in the post-HIP DS-MEA build, retaining the grain texture and having finer average grain size, as compared to the V-MEA builds. Twin formation was also suppressed in the DS-MEA builds.

Despite the minimal grain boundary movement during the HIP cycle for the DS-MEA build, XRD analysis revealed that the residual stress ($\sigma_r$) was successfully reduced from >300 MPa to near zero. SEM-EDS and X-ray diffraction confirmed that the NiCoCr MEA matrix remained a disordered solid solution in every stage of processing explored.

Microstructural analysis confirmed the successful incorporation and dispersion of nano-scale oxides throughout the build volume. Furthermore, high temperature mechanical testing of the DS-MEA builds showed significant improvements in strength and ductility over the V-MEA builds.

Figure 18:
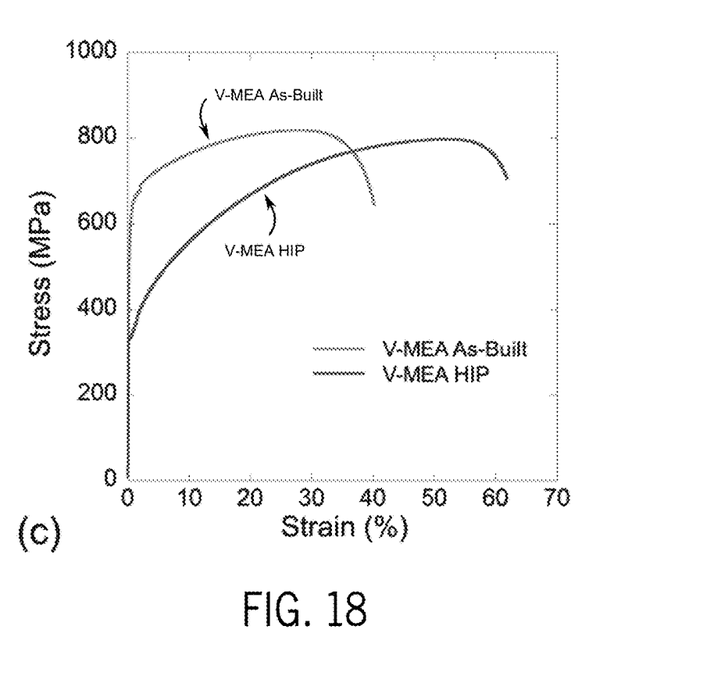
FIG. 18 is a stress-strain curve of comparative additively manufactured components subjected to tensile tests.
Figure 19:
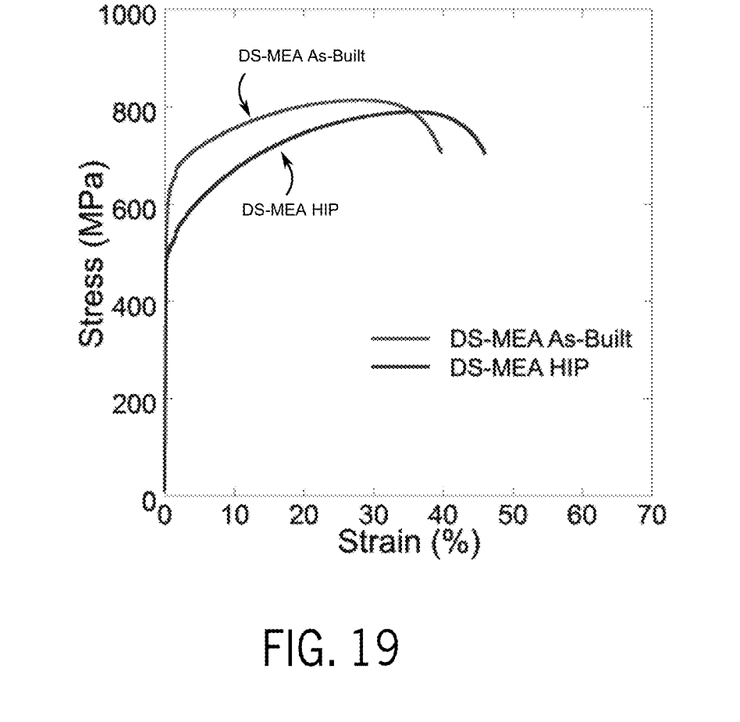
FIG. 19 is a stress-strain curve of inventive additively manufactured components subjected to tensile tests.
Figure 20:
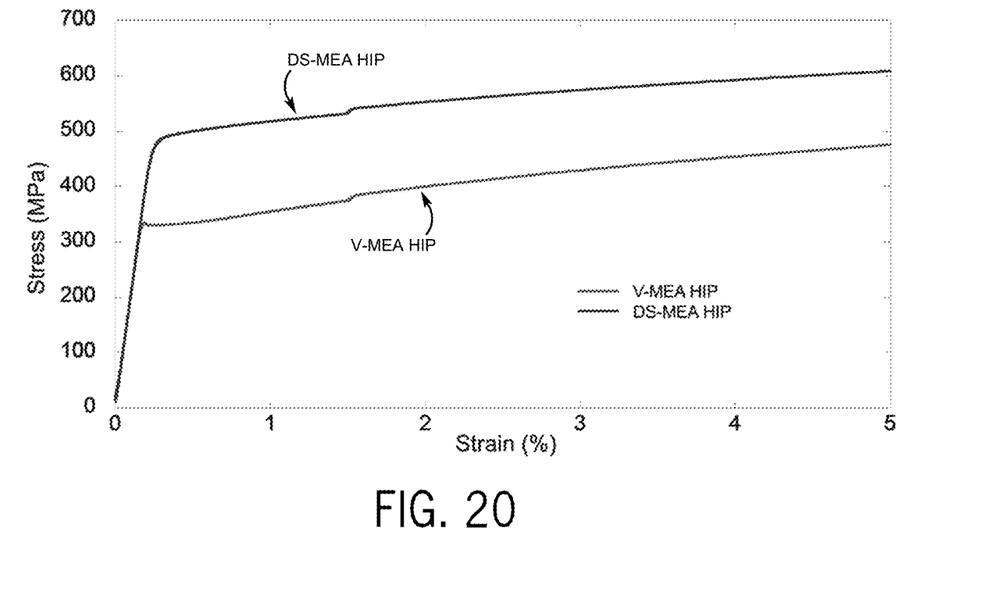
FIG. 20 is a stress-strain curve of an inventive and a comparative additively manufactured component subjected to tensile tests.

All four conditions for the examples that were analyzed in FIG. 17, were subsequently tensile tested at room temperature and at 1093° C. according to the ASTM standards E8 and E21. FIGS. 18-20 presents the stress-strain curves from the room temperature tensile tests. Notably, FIG. 20 reveals the post-HIP yield strength of the DS-MEA build to be 50% higher than the V-MEA build (496.4 MPa vs 331.6 MPa) further confirming the successful production of a dispersion-strengthened alloy. The DS-MEA build also retained the pronounced elongation and strain hardening properties inherent in the NiCoCr MPEA. In addition, the strength and ductility exhibited by the HIP V-MEA build is comparable to conventionally produced NiCoCr alloys, while the finer grain structure in the as-built V-MEA build provides higher strength and less ductility.

Figure 21:
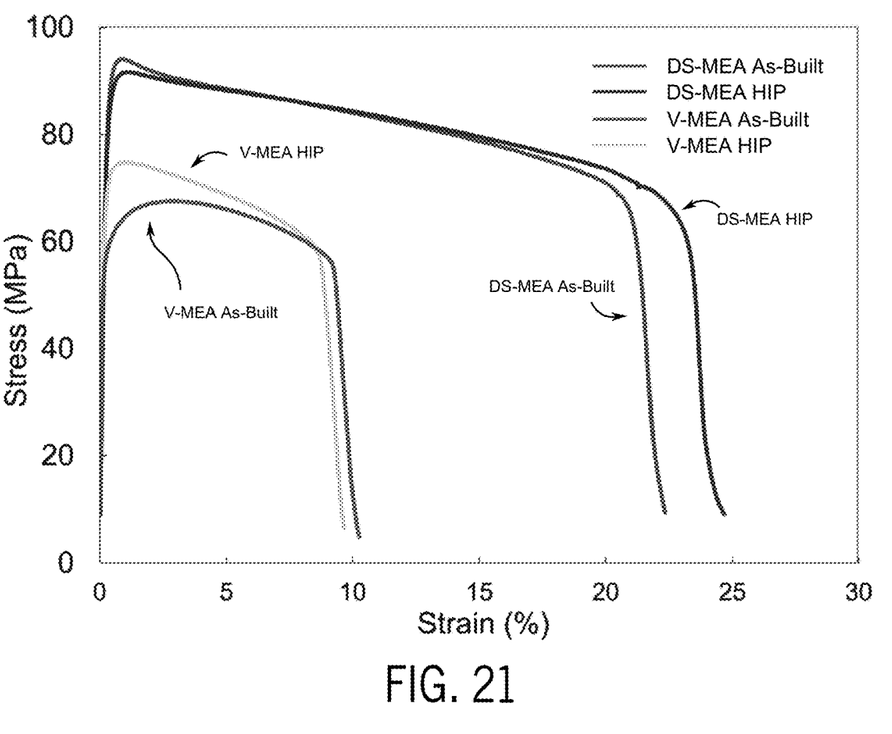
FIG. 21 is a stress-strain curve of inventive and comparative additively manufactured components subjected to tensile tests.

FIG. 21 reveals the 1093° C. tensile test results and shows that the DS-MEA builds possessed notably improved high temperature properties over the baseline V-MEA builds. In the as-built condition, the inclusion of the $Y_2O_3$ nano-sized ceramic particles 8 provided more than a 35% increase in ultimate strength and more than a 2.5 times improvement in ductility compared to the V-MEA builds. Consistent improvements were found for the HIP builds as well.

Fracture surfaces from the elevated temperature tests were examined to better understand the large strength and ductile differences between the V-MEA and DS-MEA builds. Fractography analysis reveals tensile failure, with some evidence of oxidation damage. The DS-MEA builds displayed significantly more ductility. This increase in ductility may be due to the dispersion of ceramic particles 8 in the DS-MEA builds by maintaining a finer grain structure compared to the baseline V-MEA builds. The baseline V-MEA builds also appeared to be more susceptible to localized oxidation damage.

FIGS. 18-21 reveal that the DS-MEA builds exhibited superior mechanical properties over the baseline V-MEA builds. This was most evident at the higher temperature where the ceramic particles provided significant improvements in strength and ductility. To better understand how these properties compare to the present day state-of-the-art wrought and DS superalloys, the 1093° C. ultimate strength vs. density of these alloys are plotted together in FIG. 22.

Figure 22:
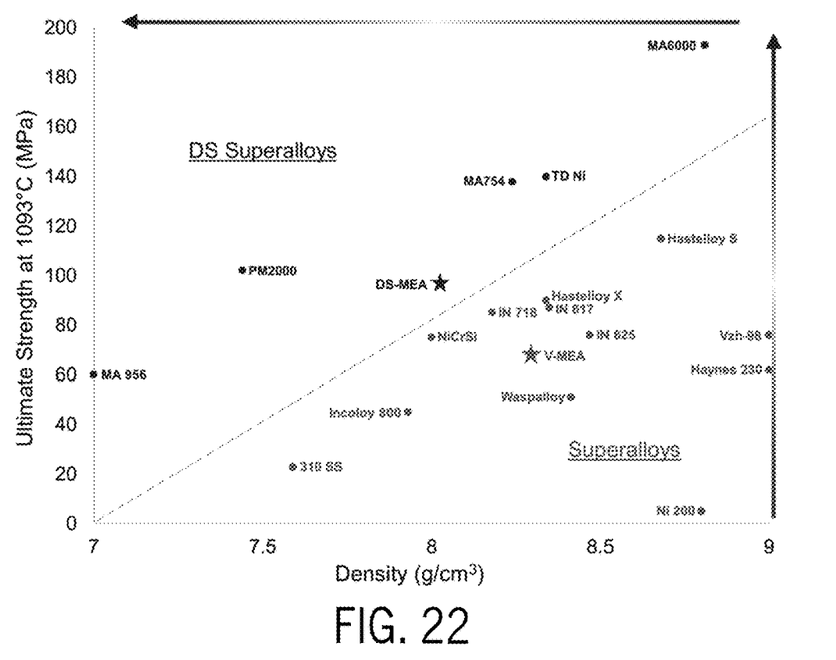
FIG. 22 is a plot showing the high temperature properties of an inventive dispersion strengthened medium entropy alloy made according the present subject matter, compared to that of mechanically alloyed dispersion strengthened superalloys and conventional wrought superalloys.

The plot in FIG. 22 shows a comparison of the high temperature properties of both DS superalloys (above the dotted diagonal line), which are currently quite difficult and resource intensive to produce due to mechanical alloying, and conventional wrought superalloys (below the dotted diagonal line). The DS-superalloys clearly present a strength improvement compared to similarly dense superalloys. Most notable, is the finding that the inventive DS-MEA builds present similar properties as other DS-superalloys. Indeed, compared to the wrought superalloys, only Hastelloy S presented a higher ultimate strength than the inventive DS-MEA build. The inventive alloys can thus be successfully leveraged to produce AM builds with comparable high temperature properties to current DS-Superalloys.

The present subject matter provides the DS alloys suitable for production through AM processes without requiring resource intensive steps, such as mechanical alloying, to incorporate dispersoids. The inventive example DS-MEA builds exhibited a 50% increase in room temperature yield strength over the baseline comparative V-MEA builds with both builds having been subject to hot isostatic pressing. More notably, the addition of nanoscale dispersed $Y_2O_3$ in the NiCoCr alloy improved its high temperature ultimate strength by greater than 35% and increased its ductility almost three-fold over the baseline NiCoCr. This economical fabrication technique represents a new, unexplored approach to producing high temperature and high strength materials that until now have been difficult to fabricate.

For the inventive and comparative examples, NiCoCr powder was purchased from Praxair Inc. The powder's composition in weight percent was 34.66% Cobalt, 30.29% Chromium, 34.90 Nickel, combined with trace amounts (<0.02%) of Silicon, Iron, Nitrogen, and Oxygen. The powder was sieved using +270 and −325 mesh to acquire an average diameter of 14.1 um as determined using a Horiba PSA300 Static Image Analysis System Particle Size. The dispersoids used in the AM process were nanoscale $Y_2O_3$ powder acquired from American Elements with a diameter range between 100-200 nm. The powder was certified 99.999% pure Yttrium Oxide.

Batches including 500 g of NiCoCr and 5 g of $Y_2O_3$ powder were poured together in a polyurethane container and sealed using electric tape around the lid. Each container was mixed using a Resodyn LabRAM II Acoustic Mixer in 10-minute increments for a total of 60 minutes, letting the powder cool between each session. Post-mixed powder was then sieved using a 230 mesh screen to remove any large oxide or metallic powder particles. Both unmixed (V-MEA) and mixed (DS-MEA) NiCoCr powders were used to additively build microstructural and mechanical test components using an EOS M100 selective laser melting machine. Two-inch tall vertical test specimens were built upon 304 stainless steel build plates. All samples were then removed from the build plates using electric discharge machining (EDM).

For SEM analysis, samples were polished using SiC grit paper followed by 0.5 diamond suspension. Afterwards a final polish using 0.05 colloidal silica for 24 hours was employed on samples used for EBSD analysis. Oxide volume fraction analysis was performed on a Zeiss Auriga-FIB using an Everhart-Thornley secondary electron detector with low accelerating voltage (3 kV). By utilizing low accelerating voltage sub-surface oxide particles were avoided, thereby ensuring a more accurate volume fraction measurement. EBSD orientation mapping was performed using an EDAX Hikari EBSD detector with an 800 nm spot size. Post-processing of the maps was done using the TSL OIM Data Collection 7 software. Average grain diameters extracted from the maps did not include twin boundaries or grain sizes less than 3 um to remove effects from scan noise. High resolution imaging of the $Y_2O_3$ coating on the NiCoCr powder was performed using a Tescan MAIA3 in the ultra-high resolution (UHR) configuration at 15 kV. Chemical maps were performed using an Oxford Ultim Max Silicon Drift Detector and Aztec Software. Residual stresses were measured at the surface using a Bruker D8 Discover (area detector) X-ray diffractometer aligned in accordance with the approach and error bounds specified in ASTM E 915-10 but applied to the side-inclination rather than iso-inclination method. Data was gathered using Mn Ka radiation and the (311) crystallographic plane on a specimen target area of 1.2 mm². Each residual stress dataset consisted of 24 area detector frames taken at 4 sample tilt (psi) angles (0°, 15°, 30°, and 45°) and 6 sample rotation (phi) angles (0°, 45°, 90°, 180°, 225°, and 270°). X-ray penetration depth decreased with increasing psi angle, going from 29 μm to 20 μm, representing depths that correspond to a 99 percent contribution to the diffracted beam. These X-ray results were analyzed using the Bruker LEPTOS v.7 software. Peak width was measured using the TOPAS program.

To better understand the effect post-processing may have on both the microstructure and mechanical properties of the L-PBF MEA samples, different HIP cycles were performed. Samples of both the V-MEA and DS-MEA underwent a HIP cycle at 1185° C. while wrapped in Ta foil to mitigate oxidation. The HIP cycle also had the benefit of removing residual stress. This provides a better comparison between the DS and V-MEA samples as residual stress has been shown to affect mechanical properties.

Room temperature and elevated tensile tests were performed by Metcut Research Inc. for both the V-MEA and DS-MEA test specimen after different post processing pathways. All tensile tests were performed using ASTM E8 standard.

It will be appreciated that various of the above-disclosed embodiments and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. An additive manufacturing powdered composite material comprising metal particles coated with a continuous coating of ceramic particles, wherein:
the metal particles comprise an alloy including:
30-35 wt % cobalt,
26-31 wt % chromium,
0-3.0 wt % rhenium,
0-1.0 wt % aluminum,
0.01-0.1 wt % carbon,
0-1.0 wt % titanium, and
nickel making up a balance of a weight of the alloy, wherein the alloy includes greater than 30 wt % nickel,
the ceramic particles comprise yttrium oxide, hafnium oxide, zirconium oxide, aluminum oxide, thorium oxide, or combinations thereof,
the ceramic particles form the continuous coating on an outer surface of the metal particles.

2. The composite material according to claim 1, wherein the alloy comprises:
30-35 wt % cobalt,
26-31 wt % chromium,
0.01-0.1 wt % carbon, and
at least one of:
a) 0.1-3.0 wt % rhenium,
b) 0.1-1.0 wt % aluminum, and
c) 0.1-1.0 wt % titanium, and
nickel making up a balance of the weight of the alloy, wherein the alloy includes greater than 30 wt % nickel.

3. The composite material according to claim 1, wherein the alloy comprises:
30-35 wt % cobalt,
26-31 wt % chromium,
0.01-0.1 wt % carbon,
0.25-1.5 wt % niobium,
1.5-4.5 wt % tungsten, and
at least one of:
a) 0.1-3.0 wt % rhenium,
b) 0.1-1.0 wt % aluminum, and
c) 0.1-1.0 wt % titanium, and
nickel making up a balance of the weight of the alloy, wherein the alloy includes greater than 30 wt % nickel.

4. The composite material according to claim 3, wherein the alloy has a freezing range of less than or equal to 80° C.

5. The composite material according to claim 1, wherein the metal particles are included at 95.0-99.5 wt % of the composite material.

6. The composite material according to claim 5, wherein the ceramic particles are included at 0.9-1.1 wt % of the composite material and consist of yttrium oxide.

7. The composite material according to claim 1, wherein the metal particles are micron sized.

8. The composite material according to claim 7, wherein the metal particles have a rounded shape and an average particle size of 10-45 μm.

9. The composite material according to claim 7, wherein the ceramic particles are nano-sized.

10. The composite material according to claim 9, wherein the ceramic particles have an average particle size of 100-200 nm.

11. The composite material according to claim 10, wherein the coating completely covers the metal particles and has an average coating thickness of 100-500 nm.

* * * * *